July 13, 1965
N. E. HAGER, JR
3,194,071
HEAT FLOW METER
Filed March 14, 1962
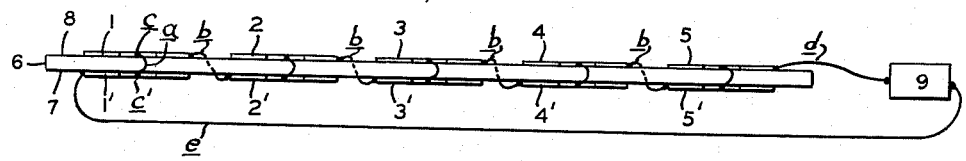
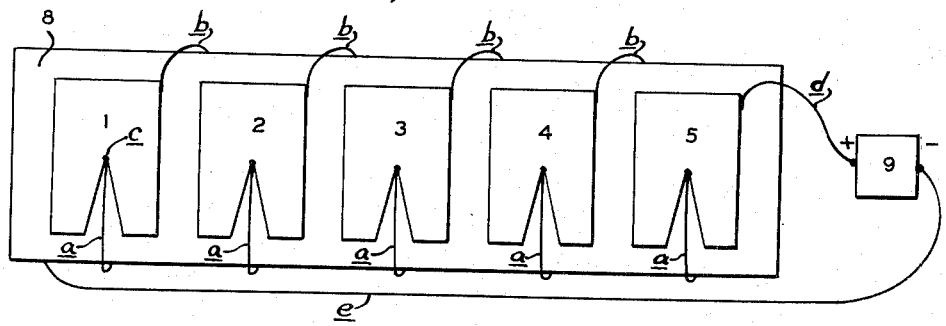
*INVENTOR.*
NATHANIEL E. HAGER, JR.
BY United States Patent Office 3,194,071
Patented July 13, 1965

3,194,071
HEAT FLOW METER
Nathaniel E. Hager, Jr., Manheim Township, Lancaster County, Pa., assignor to Armstrong Cork Company, Lancaster, Pa., a corporation of Pennsylvania
Filed Mar. 14, 1962, Ser. No. 179,561
5 Claims. (Cl. 73—341)

This invention relates to a new and improved meter suitable for measuring heat flow and more particularly relates to a meter which responds to heat flow fields of the magnitude frequently encountered in practical insulation research.

The basic element of a heat meter consists of a core of material having a given thickness and thermal conductivity and having means for measuring the difference between the temperatures of the major plane surfaces. When this element is in an equilibrium heat flow field with heat flowing everywhere in a direction normal to the major surfaces, a temperature difference appears and the heat flux may be computed from the Fourier heat transfer equation:

$$\frac{Q}{A} = \frac{k \Delta T}{D}$$

In the equation Q is the heat flow rate, A is the area of the heat flow path, $k$ is the thermal conductivity of the material in the heat flow path (core material), $\Delta T$ is the temperature differential between the two surfaces between which the heat flow is taking place, and D is the distance between the two surfaces (thickness of core).

Most often $\Delta T$ is measured by means of a differential thermocouple system and, where heat is flowing in the system:

$$\Delta T = C \Delta E$$

where $\Delta E$ is the net E.M.F. produced by the couple and C is a temperature-dependent coefficient for the pair of metals used in the thermocouple system.

This theory for heat flow meters is somewhat idealistic and in practical cases it is found that numerous difficulties arise with meters which are commercially available.

The primary object of this invention is to provide an improved heat flow meter whose calibration and use can be understood and predicted so that a number of meters can be made which can all be used with the same calibration.

Another object of this invention is to provide an improved meter whose performance is understood in terms of a simple theory and whose suitability for a given application can be readily assessed by persons skilled in the art.

It is another object of this invention to provide a heat flow meter whose response to a given heat flux can be calculated at any mean temperature at which the physical properties of the core and of the thermocouple system are known thus eliminating the time-consuming process of experimentally calibrating each individual meter over the required range of mean temperatures.

These and other objects of the invention will be more evident from the description which follows when taken in conjunction with the drawing.

Referring to the drawing:

FIG. 1 is a side elevation illustrating a heat flow meter embodying the objects of our invention and FIG. 2 is a top view illustrating a heat flow meter embodying the objects of our invention.

The meter illustrated in these figures includes a uniform thin core of homogeneous isotropic insulating material 6 having a lower surface 7 and upper surface 8, a thermopile consisting of a plurality of differential thermocouples connected in series, and a potentiometer 9 connected in series across the thermopile. Each of the differential thermocouples is formed from pairs of substantially identical thin copper platelets, Nos. 1 to 5 and 1' to 5', arranged on opposite faces 7 and 8 of said insulating core 6. A given differential thermocouple is formed from two of the substantially identical platelets arranged opposite one another, for instance, platelets 1 and 1', with a constantan wire lead $a$ connecting said platelets at the centers $c$ and $c'$ thereof. Copper wire leads $b$ connect the plurality of differential thermocouples in series with copper leads $d$ and $e$ connecting the potentiometer in the circuit in series. Each of the substantially identical thin copper platelets has a thin section cut to the center thereof with the junction with the constantan wire being at the apex of this thin section and in the same general plane with the thin copper platelet. Thus, the constantan wire $a$ passes from the junction $c$ in platelet 1 in non-electrical contact with the sides of the section, through the section and around the core and, in non-electrical contact with the sides of the section cut in the platelet 1' on the opposite side, to form a junction with platelet 1' at the apex $c'$ of said section.

An experimental heat meter was made as shown in FIGS. 1 and 2 from a 2.0" x 7.25" core slab 6 which was cut from a sheet of cork-rubber composition having a thickness of 0.139"±.002" and a density of 10.5 lbs./ft.$^3$. The 1.5" x 1.0" copper platelets, 1 to 5, inclusive, and 1' to 5', inclusive, were cut from 0.006" foil, and V-shaped notches were shaped as shown, extending from the center of the platelet to one of the short edges. A short length of No. 30 constantan wire $a$ was soldered to the apex $c$ of the notch of each copper platelet on surface 8 of the core, and each wire was cut just long enough to reach around the edge of the meter core 6 where it was soldered to the apex $c'$ of the notch in the platelet directly on the opposite surface 7 of the core. A short length of No. 40 copper wire was connected from the edge of platelet 1 to an edge of the platelet 2' on the opposite side of the core. Similar wires were used as leads connecting the remaining differential thermocouples in series. Teflon-covered No. 30 copper wire leads $d$ and $e$ were soldered to the edges of platelets 5 and 1' and to the terminals of potentiometer 9. The platelets were fastened to the core material with a suitable adhesive, which was thinned to the point that it caused a minimal increase in the effective thickness of the core, yet provided the desired bond. The over-all thickness of the meter including the adhesive layers and platelets was 0.155±.003" for the combined thickness of the core and the two adhesive layers.

Twelve heat meters were constructed according to the description in the preceding example. Care was taken to make them as nearly the same as possible without use of elaborate procedures. The sensitivity for this type of meter was computed from knowledge of the physical and geometrical properties of the meter, and the sensitivities of several representatives of the group were determined experimentally by measuring the heat flux through the meter and at the same time measuring the output potential.

The sensitivity factor S for the type of heat meter constructed was computed from the equation:

$$S = \frac{nD}{kC}$$

where $n$ is the number of pairs of platelets used. The thermocouple constant C was computed from known values for the material used and the meter core thermal conductivity was measured by the use of standard thermal conductivity apparatus. The thickness of the core material D was measured during construction and, since the slab thickness before adding adhesive was 0.139±0.002" and after assembly was 0.143±0.003", it was concluded that the finished meters included a 0.002" layer of adhesive at each surface of the core. Because the adhesive was a rubber-based type and because the thermal conductivity of rubber is three or four times as high as that of the slab material used, it is concluded that the additional thermal resistance of both adhesive layers is about the same as that of 0.001" of the slab material. This is taken into account by taking the core thickness to be 0.140" and ignoring the presence of the adhesive. The sensitivity factor is computed in tabular form in Table 1. The change in D with temperature is small and has been ignored.

Table 1

| Quantity | Units | Temperature, °F. | | | |
|---|---|---|---|---|---|
| | | −200 | −100 | 0 | +100 |
| n | | 5 | 5 | 5 | 5 |
| C | F. °/μv | 1.073 | 0.058 | 0.0487 | 0.0431 |
| D | Inches | 0.140 | 0.140 | 0.140 | 0.140 |
| k | B.t.u.-inches/hr.-ft.$^2$ °F. | 0.162 | 0.205 | 0.255 | 0.310 |
| S | μv-ft.$^2$-hr./B.t.u | 58.6 | 58.8 | 56.3 | 52.3 |

Four of the heat meters thus prepared were calibrated in a standard Northrup thermal conductivity apparatus, in which a slab of known thermal conductivity and two of the meters were sandwiched between two isothermal horizontal plates. The hottest of the two plates was in the upper position. The plates and the standard slab were 12" square in the apparatus used, and since the meters did not fully occupy the sample plane, extra slabs of the meter core material were placed around the meters. A 0.125" sheet of cellular polystyrene was placed above and below the region occupied by the meters to prevent electrical contact between the meter platelets and the adjacent hot plate or the platelet inserted between the meters and the standard slab for measuring the temperature drop across the standard slab. The heat fluxes $Q/A$ used for calibrating the meters were of the order of 6.5 B.t.u./ft.$^2$-hr., and the E.M.F.'s produced by the meters were of the order of 340 μv. A large number of readings were taken for the meters tested, and the sensitivity factors were computed in accordance with the sensitivity equation:

$$S = \frac{A \Delta E}{Q}$$

where $\Delta E$ is the E.M.F. produced by the meter. The results are tabulated in Table 2 hereinbelow, and it is immediately noted that the sensitivity factors are well within 1% of a mean value for the four meters, and that the mean value agrees well with that predicted by computation.

Table 2

| Meter No. | Temperature (°F.) | μv-hr.-ft.$^2$/B.t.u. |
|---|---|---|
| 7374 | 104 | 52.1 |
| 7576 | 104 | 52.7 |
| 9394 | 103 | 52.6 |
| 9596 | 103 | 51.9 |

Eight of the meters were calibrated using a thin heater apparatus of the type described in Hager, U.S. patent application Serial No. 802,141, filed March 26, 1959, now U.S. Patent No. 3,045,473, including the four previously calibrated in the Northrup device. Determinations were made at room temperature, at the melting temperature of ice, and at Dry Ice temperature. Again, since the meters did not occupy the whole heater, some of the core material was used to guard the edges. With the thin heater used, the sensitivity factor is given by the equation:

$$S = \Delta E W^2 t / 1.707 i^2 p$$

where the heater width W is 0.667 feet, the heater thickness $t$ is 0.000281 feet, the heater current $i$ is in amperes, and the heater resistivity $p$ is in ohm-ft. This equation is used to compute the values of sensitivity appearing in Table 3, hereinbelow. Since one meter was placed on each side of the thin heater, and the meters were assumed to be identical, the results given are average values for the meters in pairs. A thin sheet of polyethylene terephthalate was placed between the meters and the heater to insulate electrically.

Table 3

| Meter | T (°F.) | ΔE (μv.) | i$^2$ | p(T) (ohm-ft.) | S(μv.-ft.$^2$-hr./B.t.u.) |
|---|---|---|---|---|---|
| 7374, 7576 | 84 | 110.5 | 63.75 | 2.51 × 10$^{-6}$ | 51.5 |
| 8182, 8384 | 85 | 115.0 | 64.0 | 2.51 × 10$^{-6}$ | 53.4 |
| 9394, 9596 | 83 | 113.0 | 64.9 | 2.51 × 10$^{-6}$ | 51.7 |
| 7778, 7980 | 90 | 117.7 | 65.0 | 2.52 × 10$^{-6}$ | 53.4 |
| 7374, 7576 | 32 | 105.2 | 60.8 | 2.45 × 10$^{-6}$ | 52.7 |
| 9394, 9596 | 32 | 113.0 | 65.3 | 2.45 × 10$^{-6}$ | 53.4 |
| 9394, 9596 | 32 | 113.0 | 65.4 | 2.45 × 10$^{-6}$ | 52.5 |
| 7374, 7576 | −110 | 111.0 | 61.0 | 2.25 × 10$^{-6}$ | 60.2 |
| 7778, 7980 | −110 | 116.0 | 64.0 | 2.25 × 10$^{-6}$ | 60.0 |
| 7778, 7980 | −110 | 114.0 | 64.0 | 2.25 × 10$^{-6}$ | 59.9 |
| 7778, 7980 | −110 | 123.0 | 67.2 | 2.25 × 10$^{-6}$ | 60.6 |

When calibrating or using heat meters the degree of precision obtainable depends partly on how accurately the thermocouple E.M.F. can be measured. Modern microvoltmeters and potentiometers are capable of reading any potential exceeding about 0.3μv., and the heat meter should be designed for a given application so that the prevailing heat fluxes will cause generation of an E.M.F. exceeding 30μv. in order to take advantage of the potential accuracy of the meter.

It is also estimated that the differential thermocouple measures temperature differences with an error less than $(30/\Delta E + 1.05)$ percent when high quality uncalibrated thermocouple wire is used with the Leeds and Northrup K-2 potentiometer, where $\Delta E$ is the potential in microvolts. Since the heat flux through the meter is probably known to within about 2% in the Northrup and thin heater devices, it is seen that the probable error in the experimental determination of the sensitivity factor need not exceed 2 or 3%.

As shown in the examples, the core is formed of a homogeneous isotropic insulating material. However, in practicing this invention, the core may be formed from any uniformly thin thermal insulating material which transfers heat between its two major surfaces everywhere at the same rate per unit area. This rate then can be readily predicted from knowledge of the temperature difference between the two major surfaces, the thickness of the core, and the effective thermal conductivity of the core as measured in an apparatus in which heat flows through the core along the same general paths as in the meter. Since the thickness of the meter core is of the order of 0.10" and can be measured and controlled to within 0.001", the error is of the order of 1%. Preferably the core thickness should be uniform throughout to about ±2% and may vary from about 0.1" to 0.5" depending on core material and factors such as core interference to heat flow. The thermal conductivity of the core material can be measured to within 2% accuracy, and the error in C is no greater than 1%, so that the probable error in computing the sensitivity factor of the meters of this invention should not exceed 3%.

The substantially identical metal platelets are conveniently formed of copper foil, although they may also be formed from foils of such metals as gold, platinum, silver, or other metals having thermal conductivities greater than about 500 B.t.u.-inches/hr.-ft.$^2$-°F. Of these metals, those selected as suitable for thermocouple elements and calibrated by the National Bureau of Standards are preferred. The foils may vary in thickness from about 0.001" to about 0.025" and preferably should be uniform in thickness to about ±5% to assure uniform heat distribution in the platelet. The platelets may be formed in any of a variety of shapes as long as all the platelets in a given meter are substantially identical. In order to assure proper meter sensitivities, the distances from the center of a given platelet to the nearest edge thereof must be greater than or equal to three and preferably equal to or greater than five times the core thickness.

To assure that substantially all heat flow through the meter is through the core material, the wire leads are selected such that less than 2% of the heat passing through the meter passes by way of the wire leads.

In order to insure maximum accuracy, the differential thermocouple leads are preferably connected to the centers of the platelets although satisfactory accuracy may be maintained by connecting the differential thermocouple leads to a point in the central region of a platelet, generally any point in an area defined by the center and a radius equal to one half the distance from the center to the nearest edge of a platelet.

The leads passing between the centers of the pairs of platelets and forming the differential thermocouples therewith, constantan wire leads in the meter hereinabove described, are of a metal dissimilar to that from which the platelets are formed and developed a thermoelectric E.M.F. in junction with the platelets. The leads connecting the differential thermocouples in series to form a thermopile may be of the same metal as that of the platelets or may be of a dissimilar metal if the thermoelectric E.M.F. developed by the junction of a lead and a platelet is no more than 2% of the thermoelectric E.M.F. developed by a thermocouple lead in junction with a platelet.

In place of the potentiometer, other means for measuring the E.M.F.'s generated by the thermopile, such as microvoltmeters, might be used equally as well.

The meters of this invention have the same sensitivity when placed adjacent to a highly conducting material as when placed next to a thermal insulating material. This has been verified by calibrating meters against stainless steel, aluminum, water, and insulating materials. As shown in Table 1, the response of the meters to a given heat flux can be calculated at any mean temperature at which the physical properties of the slab and the thermocouple system are known; thus, the process of experimentally calibrating each individual meter over the required range of mean temperatures is eliminated. In effect, the calibration of a meter requires only a few minutes instead of several days. Also, as shown in the foregoing tables, the performance of a dozen meters so constructed has been found experimentally to be uniform within 2% of the average, and since the experimental error is as large as 3%, it is concluded that the observed lack of uniformity is insignificant. On the other hand, with meters of known design such as the woven-ribbon type meters, difficulties were experienced in constructing a series of identical meters which could be readily calibrated. With these meters, the sensitivities of a series of such meters were found to vary by as much as 34% from the mean.

The heat meter of this invention has a low heat conductance which is substantially the same as that of the core component. Thus, when the meter is placed in insulated systems, heat flow measurements can be readily made without disturbing the heat flow field.

I claim:
1. A heat flow meter comprised of
   (1) a uniformly thin core of insulating material between whose major surfaces heat is transmitted everywhere at the same rate per unit area,
   (2) a plurality of substantially identical metal platelets of a metal having a thermal conductivity greater than 500 B.t.u.-inches/hr.-ft.$^2$-° F. arranged on the opposite major surfaces of said core and wire leads of a metal, which develops a thermoelectric E.M.F. in junction with a platelet, connecitng in pairs platelets on opposite surfaces in the central region thereof and extending therebetween in non-electrical contact to form a plurality of differential thermocouples, the distance from the center of said platelets to the nearest edges thereof being equal to or greater than three times the thickness of the core,
   (3) wire leads connecting said differential thermocouples in series and forming a thermopile in which the E.M.F.'s generated by said differential thermocouples are additive, said wire leads being of a metal which develops an E.M.F. in junction with said platelets which is less than 2% of the E.M.F. developed by the differential thermocouple lead in junction with a platelet, and,
   (4) means for measuring the E.M.F. generated by said thermopile connected in series therewith.
2. The heat meter of claim 1 in which the core thickness throughout is uniform to about ±2%.
3. The heat meter of claim 2 in which the connecting wire leads in said thermopile carry less than about 2% of the total heat passing through the core material.
4. A heat flow meter comprised of
   (1) a thin core of from about 0.1″ to 0.5″ in thickness of homogeneous isotropic insulating material which is uniform in thickness throughout to about ±2%,
   (2) a plurality of differential thermocouples comprised of substantially identical pairs of platelets formed from copper foil having a thickness of from about .001″ to .025″, the foil thickness being uniform throughout to about ±5%, arranged on opposite faces of said core, the distance from the center of a platelet to the nearest edge thereof being substantially equal to or greater than five times the thickness of said core, and constantan wire leads connecting each of said pairs of copper platelets at the centers thereof and extending therebetween in non-electrical contact with said platelets except at the junctions at the centers thereof,
   (3) copper wire leads connecting said differential thermocouples in series and forming a thermopile in which the E.M.F.'s generated by said differential thermocouples are additive, and
   (4) means for measuring the E.M.F. generated by said thermopile connected in series therewith.
5. The heat meter of claim 4 in which the connecting wire leads in said thermopile carry less than about 2% of the total heat passing through the core material.

References Cited by the Examiner

UNITED STATES PATENTS

| | | | |
|---|---|---|---|
| 1,528,383 | 3/25 | Schmidt | 73—341 |
| 2,878,669 | 3/59 | Knudson et al. | 73—15 |

FOREIGN PATENTS 587,996 5/47 Great Britain.

OTHER REFERENCES

Pages 984 and 985, August 1961, "Steady State Heat Flux Guage," Review of Scientific Instruments, vol. 32.

RICHARD C. QUEISSER, *Primary Examiner.*

DAVID SCHONBERG, *Examiner.*